United States Patent
Hamann et al.

(10) Patent No.: US 8,616,191 B2
(45) Date of Patent: Dec. 31, 2013

(54) WIRE SAW AND METHOD FOR PRODUCING A WIRE SAW

(75) Inventors: Christoph Hamann, Thalmassing (DE); Carsten Schuh, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 908 days.

(21) Appl. No.: 12/594,459

(22) PCT Filed: Apr. 3, 2008

(86) PCT No.: PCT/EP2008/053989
§ 371 (c)(1),
(2), (4) Date: Oct. 2, 2009

(87) PCT Pub. No.: WO2008/122564
PCT Pub. Date: Oct. 16, 2008

(65) Prior Publication Data
US 2010/0043769 A1 Feb. 25, 2010

(30) Foreign Application Priority Data
Apr. 4, 2007 (DE) .......................... 10 2007 016 334

(51) Int. Cl.
*B28D 1/08* (2006.01)

(52) U.S. Cl.
USPC ........... 125/16.01; 29/25.35; 125/20; 125/21; 451/41

(58) Field of Classification Search
USPC .............. 29/25.35; 83/651.1, 746; 125/16.01, 125/16.02, 19, 20, 21; 451/41
See application file for complete search history.

(56) References Cited

U.S. PATENT DOCUMENTS

| | | | |
|---|---|---|---|
| 3,841,297 A * | 10/1974 | Mech ................................ 125/12 |
| 3,942,508 A * | 3/1976 | Shimizu ...................... 125/16.01 |
| 4,494,523 A | 1/1985 | Wells ........................... 125/16 R |
| 5,907,988 A * | 6/1999 | Kiuchi et al. ................. 83/651.1 |
| 6,371,101 B1 | 4/2002 | Hauser ....................... 125/16.01 |
| 6,510,774 B1 * | 1/2003 | Steiner ......................... 83/200.1 |
| 8,298,042 B2 * | 10/2012 | Modler et al. .................... 451/8 |

FOREIGN PATENT DOCUMENTS

| | | | | |
|---|---|---|---|---|
| JP | 08216012 A | 8/1996 | ............. B24B 27/06 |
| JP | 2000094298 A | 4/2000 | ............. B24B 27/06 |
| JP | 2001524035 A | 11/2001 | ............. B23D 57/00 |
| JP | 2002144213 A | 5/2002 | ............. B24B 27/06 |
| WO | 2004/071708 | 8/2004 | ............. B24B 27/06 |

OTHER PUBLICATIONS

International PCT Search Report, PCT/EP2008/053989, 16 pages, mailed Jul. 25, 2008.
Japanese Office Action, Japanese Patent Application No. 2010-501511, 13 pages, Mar. 14, 2012.

* cited by examiner

*Primary Examiner* — Timothy V Eley
(74) *Attorney, Agent, or Firm* — King & Spalding L.L.P.

(57) ABSTRACT

A wire saw (S) for separating a plurality of ceramic components (11-16) from a ceramic component block (1) has a roller system (2), the roller system has a plurality of deflecting rollers (3-5) guiding a wire (6) to form a wire harp (7), wherein at least one of the deflecting rollers (3) is divided into separate discs (31-36) guiding a single wire winding (61-66) of the wire (6) and being inclined at an adjustable angle (a) of less than 90 DEG to an axle (A) connecting the centers (M1-M6) of the discs (31-36).

14 Claims, 4 Drawing Sheets

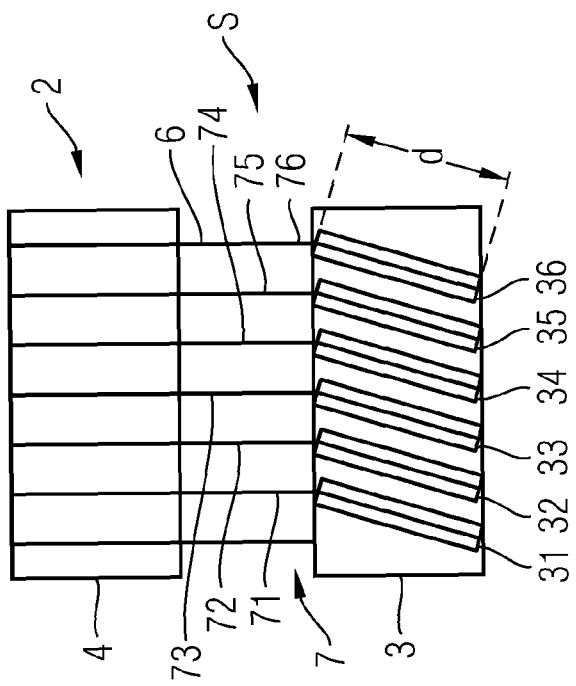
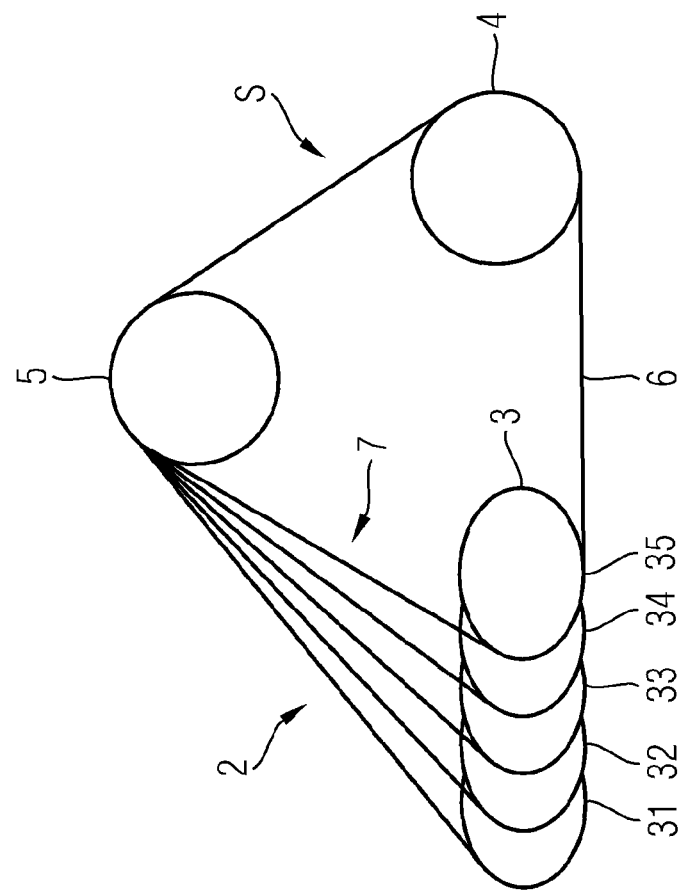

WIRE SAW AND METHOD FOR PRODUCING A WIRE SAW

CROSS-REFERENCE TO RELATED APPLICATIONS

This application is a U.S. National Stage Application of International Application No. PCT/EP2008/053989 filed Apr. 3, 2008, which designates the United States of America, and claims priority to German Application No. 10 2007 016 334.9 filed Apr. 4, 2007, the contents of which are hereby incorporated by reference in their entirety.

TECHNICAL FIELD

The invention relates to a wire saw for separating a plurality of ceramic components from a ceramic component block and to a method for separating a plurality of ceramic components from a ceramic component block.

BACKGROUND

Ceramic component blocks are typically piezo stacks which are used in the production of piezo actuators.

A piezo actuator generally consists of a number of piezoceramic plates. A piezoceramic is a material which expands because of the piezoelectric effect when a voltage is applied to it. Such piezoceramics form the basis for the piezo actuators, which implement a movement path of a few micrometers when a voltage is applied. The piezoceramic has electrical dipole moments which each exhibit a preferred direction within Weiss domains which are delimited from one another. In an unpolarized basic state of the piezoceramic the preferred directions of the individual Weiss domains have no arrangement so that to the outside there is no macroscopic electrical polarization of the piezoceramic present.

To make the piezoelectric effect usable for piezo actuators, the piezoceramic must be polarized by the alignment of the electrical dipole moments, after which the electric dipole moments in all Weiss domains do not deviate or deviate only slightly from a preferred direction specified by the polarization axis. The piezoceramics are used for example as basic bodies of piezo actuators, which are used in such areas as automotive technology, for example as electromagnetic converters in common rail injection systems for internal combustion engines.

The individual piezoceramics described above are provided on both sides with metallic electrodes or internal electrodes. If a voltage is applied to these internal electrodes, the piezoceramic reacts with a lattice distortion which leads along the main axis to the usable length extension already described above. Since however this only amounts to 2 thousandth of the layer density along the main axis, to achieve the desired absolute length extension a correspondingly greater layer thickness of active piezoceramics must be provided. With increasing layer thicknesses of the individual piezoceramic layers within a piezo actuator however, the voltage required to make the piezo actuator respond also increases. To keep this within manageable limits, the thicknesses of individual piezo layers with multilayer actuators usually lies between 20 μm and 200 μm. Therefore, for a desired length expansion, a piezo actuator must have a corresponding number of individual ceramic layers.

It is known to the inventor that piezo stacks can be manufactured for example by arranging piezo ceramic green films in a stack alternately with internal electrode material.

The inventor also knows from internal sources that the piezo stack can be manufactured in multi images by stacking a plurality of "green" unsintered ceramic films or piezo ceramic green films or piezo layers onto each other and subsequently compressing them. This stack is subsequently to be separated or to be split into a plurality of individual components.

Wire saws are known from semiconductor technology for separating or splitting the individual components. To this end FIGS. 1A and 1B show a schematic longitudinal cross section or a schematic transverse cross section of a conventional wire saw DS. With a conventional wire saw DS of this type a plurality of wafers are cut from a silicon monocrystal using a wire D or by means of parallel wire sections DA1-DA13 formed therefrom. To this end the wire D is routed several times in parallel via deflecting rollers U1-U3 in order to produce a wire harp DH or wire lattice. However the distances or the respective offset VS between the individual wire sections DA1-DA13 is restricted to a narrow measurement of a few millimeters, since otherwise the wire D would jump out of its guide or the wear on the wire D as a result of mechanical stress would be too great. This distance of a few millimeters is however too small for the cutting width of the piezo stack needed, so that the wire saws known from semiconductor technology cannot be used for separation of ceramic components, such a piezo stacks.

Such a wire saw is known for example from publication U.S. Pat. No. 4,494,523. With this wire saw in the actual saw area of the wire is guided as a type of harp over three deflection rollers arranged in a triangle having at least the diameter of the workpiece, of which one is driven. The workpiece is initially located inside the prism-type arrangement and during the separation process is pushed from below against the horizontally tensioned area of the moving wire.

SUMMARY

According to various embodiments, the ceramic components can be separated in a simple and especially low-cost manner.

According to various further embodiments, a method and a facility for separating a plurality of ceramic components from a ceramic component block or green block can be provided, which can be used independent of application.

According to an embodiment, a wire saw for separating a plurality of ceramic components from a ceramic component block has a roller system featuring a plurality of deflection rollers which guide a wire for embodying a wire harp with a least one of the deflection rollers being divided up into separate disks via which an individual wire winding of the wire is guided and which are inclined at a selectable angle of less than 90° to an axle connecting the centers of the disks.

According to a further embodiment, an adjustment facility can be provided which adjusts an offset between parallel wire sections of the wire harp to set a cut width of the wire saw as a function of a predefined diameter of the disks and the adjustable angle. According to a further embodiment, the component block can be embodied as a stack in which a plurality of ceramic green films or piezoceramic green films are arranged with an internal electrode material. According to a further embodiment, the ceramic component can be embodied as a piezo stack in which a plurality N of first internal electrodes and a plurality N of second internal electrodes are arranged, with a piezoceramic green film being arranged between a first internal electrode and a second internal electrode and the plurality N of first internal electrodes able to be contacted by a first external electrode and the plurality N of second internal electrodes by a second external electrode.

According to another embodiment, a method for producing a wire saw for separating a plurality of ceramic components from a ceramic component block, may have the following steps: —Provision of a roller system with a number of deflection rollers which guide a wire for embodying a wire harp; —Division of at least one of the deflection rollers into separate disks; —Guiding of an individual wire winding of the wire over a separate disk; and —Inclining the separate disks at an adjustable angle α, α<90°, to an axle connecting the center points of the disks.

According to a further embodiment, an offset between parallel wire sections of the wire harp can be set to adjust a cutting width of the wire saw as a function of a predefined diameter of the disks and of the adjustable angle α. According to a further embodiment, the component block may be embodied as a stack in which a plurality of piezoceramic green films are arranged alternately with an internal electrode material. According to a further embodiment, the ceramic component can be embodied as a piezo stack in which a plurality N of first internal electrodes and a plurality N of second internal electrodes are arranged, with a piezoceramic green film being arranged between a first internal electrode and a second internal electrode and the plurality N of first internal electrodes being able to be contacted with a first external electrode and the plurality N of second internal electrodes by a second external electrode.

According to yet another embodiment, a method for separating a plurality of ceramic components from a ceramic component block may have the following steps: Provision of a wire saw as described above; —Provision of a component block; and —Sawing of the component block provided into the plurality of the components by means of the wire saw provided.

According to yet another embodiment, a piezo actuator may have a piezo stack which is produced in accordance with the method as described above.

According to yet another embodiment, an injection system for injection of fuel at a predetermined fuel pressure may have a piezo actuator as described above, that it is suitable for raising and lowering a nozzle needle, which opens and closes a nozzle by means of which the fuel is injected.

BRIEF DESCRIPTION OF THE DRAWINGS

The invention is explained below in greater detail on the basis of the exemplary embodiments specified in the schematic figures. The figures show FIG. 1A a schematic longitudinal section of a conventional wire saw;

FIG. 2A a schematic longitudinal section of an exemplary embodiment of the wire saw;

FIG. 2B a schematic cross section of the wire saw as depicted in FIG. 2A;

In all figures—unless stated otherwise—the same elements and facilities or those with the same functions are provided with the same reference symbols.

DETAILED DESCRIPTION

Figure 1A:
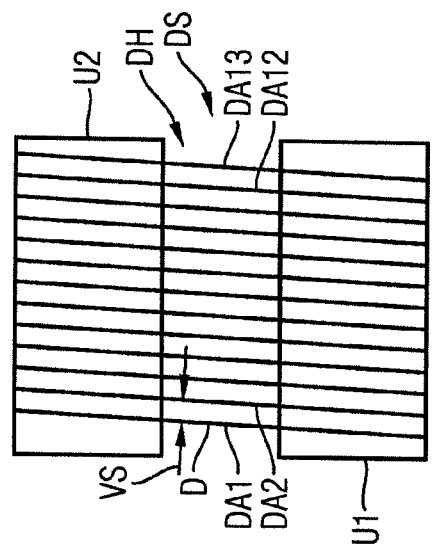
FIG. 1B a schematic cross section of the conventional wire saw as depicted in FIG. 1A.
Figure 1B:
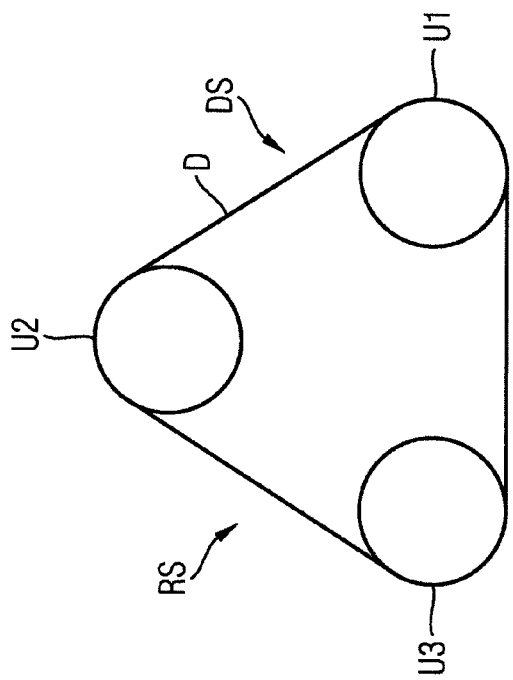

According to various embodiments, at least one of these stated objects is achieved by a wire saw as stated above and/or by a method for manufacturing a wire saw with the features as stated above and/or by a method for separating a plurality of ceramic components of a ceramic component block with the features as stated above.

Some embodiments specifies a wire saw for separating a plurality of ceramic components of a ceramic component block which features a roller system which has a plurality of deflection rollers which guide a wire for embodying a wire harp, with at least one of the deflection rollers being divided up into separate disks via which an individual wire winding of the wire is guided respectively and which are inclined in each case by an adjustable angle a of less than 90° (a<90°) to an axle connecting the center points of the disks.

Furthermore, according to other embodiments, a method for manufacturing a wire saw for separating a plurality of ceramic components is proposed which has the following steps:

Provision of a roller system with a number of deflection rollers which guide a wire for embodying a wire harp;

Dividing at least one of the deflection rollers into separate disks;

Guiding an individual wire winding or the wire in each case over a separate disk; and Inclining the separate disks at an adjustable angle a of less than 90° (a<90°) to an axle connecting the centers of the disks.

Furthermore a method is proposed for separating a plurality of ceramic components from a ceramic component block, which features the following steps:

Provision Of one of the wire saws explained above;

Provision of the component block; and

Sawing of the component block provided into the plurality of components by means of the wire saw provided.

An advantage of the various embodiments lies in the fact that, by using the wire saw, a simple and also cost effective opportunity is provided for separating ceramic components such as piezo stacks from a ceramic component block.

A further advantage lies in the fact that, by inclining the separated disks, a larger cutting width is provided for the ceramic components and/or can be set. Furthermore the wire and the disks are subjected to less stress by the invention, since the wire or the wire winding is always running straight and thus with minimum friction over the disks.

In one embodiment an adjustment facility is provided. The adjustment facility sets an offset between parallel wire sections of the wire harp for setting a cut width for the ceramic components depending on a predefined diameter of the disks and the adjustable angle between the disk plane and the centers of the axle connecting the disks. The possibility for adjusting the cutting width according to various embodiments enables the wire saw to be used independently of application, i.e. with just one wire saw ceramic components of different widths can be manufactured.

In accordance with a further embodiment the component block or green block is embodied as a stack, in which a plurality of ceramic green films or piezoceramic green films or piezo layers are arranged alternating with an internal electrode material.

In accordance with a further embodiment the ceramic component is embodied as a piezo stack, in which a plurality N of first internal electrodes and a plurality N of second internal electrodes are arranged, with a piezoceramic green film or piezo layer is arranged between a first internal electrode and a second internal electrode and the number N of first internal electrodes is able to be contacted with a first external electrode and the number N of second internal electrodes with a second external electrode.

In accordance with a further embodiment an offset is set between parallel wire sections of the wire harp for setting a cut width of the wire saws as a function of the predefined diameter of the disks of the adjustable angle.

Furthermore the invention proposes using a piezo stack manufactured as explained above for manufacturing a piezo actuator. In addition an injection system for injecting fuel at a predetermined pressure is proposed which features such a piezo actuator with such a piezo stack, with the piezo actuator being suitable for lifting and lowering a nozzle needle which opens and closes a nozzle by means of which the fuel is injected.

Figure 3:
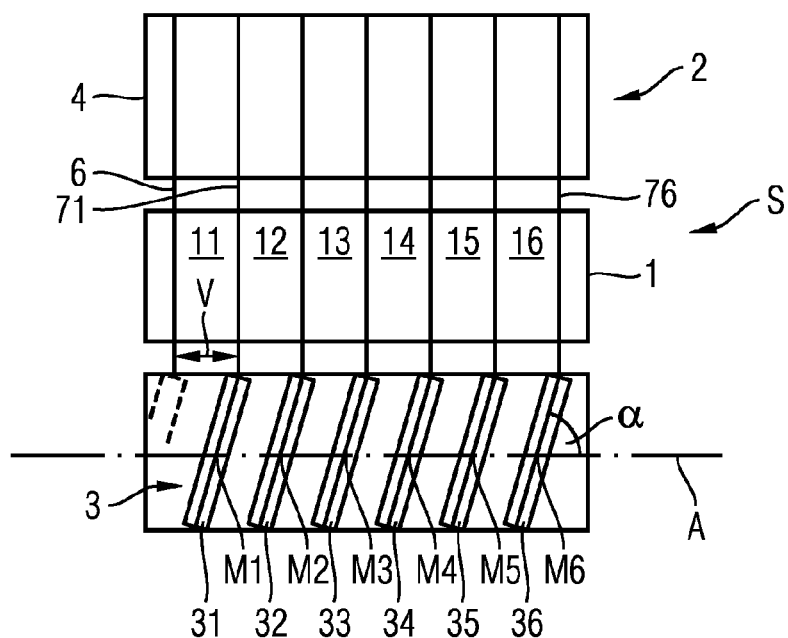
FIG. 3 the schematic longitudinal view of the exemplary embodiment of the wire saw as depicted in FIG. 2A with a schematically depicted component block.

FIGS. 2A und 2B show a schematic longitudinal section or a schematic cross section respectively of an exemplary embodiment of the wire saw S. This exemplary embodiment of the wire saw DS is further illustrated by FIG. 3, which shows the schematic longitudinal section depicted in FIG. 2A with a schematically depicted ceramic component block 1. The wire saw is suitable for separating a plurality of ceramic components 11-16 from the ceramic component block 1. To this end the wire saw S features a roller system 2 which features a number of deflection rollers 3-5. Without imposing any general restrictions, FIGS. 2A, 2B and 3 show two or three deflection rollers 3-5 respectively. The deflection rollers 3-5 guide a wire 6 or endless wire to embody a wire harp 7. The wire 6 or wire windings 61-66 respectively or its wire sections 71-76 is/are typically embodied as a diamond-impregnated saw wire.

At least one of the deflection rollers is divided up into separate disks 31-36 of a predefined diameter d. Without imposing any general restrictions, FIGS. 2A, 2B and 3 show the deflection roller 3 divided up or split into the disks 31-36.

A single wire winding 61-66 of the wire 6 is guided over the separate disks 31-36 in each case. Furthermore the separate disks 31-36 are each inclined at an adjustable angle a, a<90°, to one of the centers M1-M6 of the axle A connecting the disks 31-36.

Preferably an adjustment facility (not shown) is provided which sets a offset V as a function of the predefined diameter d and the adjustable angle a between parallel wire sections 71-76 for the ceramic components 11-16. Preferably the component block 1, shown in FIG. 3 is embodied as a stack in which a plurality of piezoceramic green films are arranged with an internal electrode material.

Furthermore the ceramic component 11-16 is preferably embodied as a piezo stack.

Figure 4:
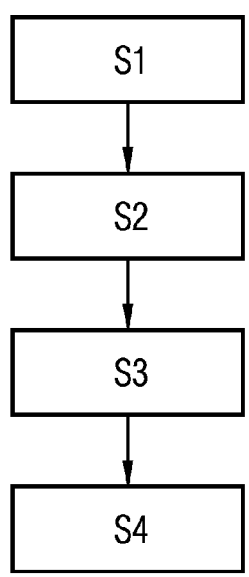
FIG. 4 a schematic flow diagram of an exemplary embodiment of the method for manufacturing a wire saw.

FIG. 4 shows a schematic flow diagram of an exemplary embodiment of the method for manufacturing a wire saw S. The method according to various embodiments is explained below with reference to the flow diagram in FIG. 4 and the sectional views of FIGS. 2A, 2B und 3. The method according to various embodiments and according to FIG. 4 for manufacturing a wire saw S for separating a plurality of ceramic components 11-16 from a ceramic component block 1 has the following method steps S1-S4:

Method Step S1:
A roller system 2 is provided with a number, which is three for example, of deflection rollers 3-5, which guide a wire 6 or endless wire to embody a wire harp 7.

Method Step S2:
At least one of the deflection rollers 3 is divided up into separate disks 31-36 of a predetermined diameter d with a predetermined thickness.

Method Step S3:
An individual wire winding 61-66 of the wire 6 is guided over a separate disk 31-36.

Method Step S4:
The separate disks 31-36 are inclined at an adjustable angle a, a<90°, to an axle A connecting the center points M1-M6 of the disks 31-36.

Preferably an offset V between parallel wire sections 71-76 of the wire harp 7 for setting a cut width of the wire saw S as a function of a predetermined diameter d of disks 31-36 and the adjustable angle a.

Preferably the component block 1 or green block is embodied as a stack in which a plurality of piezoceramic green films or piezo layers are arranged alternately with an internal electrode material or a layer of an electrode material.

Figure 5:
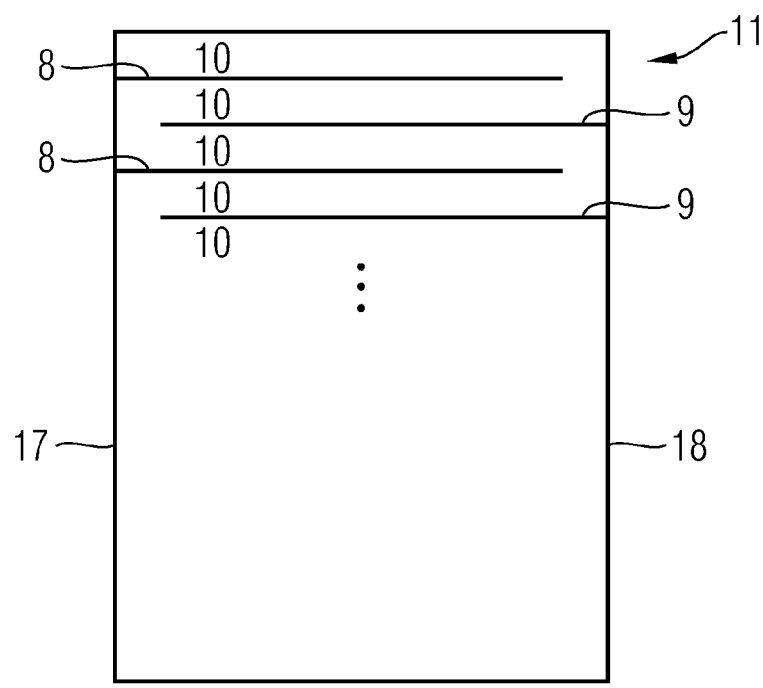
FIG. 5 a schematic block diagram of a piezo stack which is manufactured in accordance with the method shown in FIG. 4.

To this end FIG. 5 shows a schematic block diagram of a piezo stack 11 which is manufactured in accordance with the method shown in FIG. 4. The piezo stack depicted in FIG. 5 is a possible embodiment of a ceramic component 11-16. A plurality N of first internal electrodes 8 and a plurality of second internal electrodes 9 are arranged in the piezo stack 11, with a piezoceramic green film 10 being arranged between a first internal electrode 8 and a second internal electrode 9 and the plurality N of first internal electrodes able to be contacted with a first external electrode 17 and the plurality N of second internal electrodes 9 with a second external electrode 18.

Figure 6:
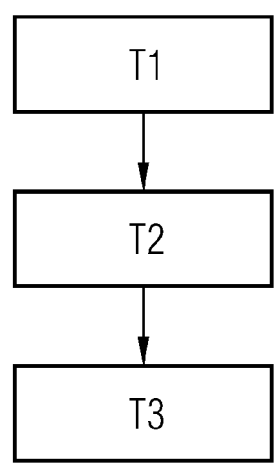
FIG. 6 a schematic flow diagram of an exemplary embodiment of the method for separating a plurality of ceramic components from a ceramic component block.

FIG. 6 shows a schematic flow diagram of an exemplary embodiment of the method for separating a plurality of ceramic components 11-16 from a ceramic component block 1. This exemplary embodiment of the method is explained below on the basis of the flow diagram with reference to the sectional views of FIGS. 2A, 2B and 3. The method according to various embodiments and as depicted in FIG. 6 has the following method steps T1-T3:

Method Step T1:
A wire saw S in accordance with FIGS. 2A, 2B and 3 is provided.

Method Step T2:
A component block 1 is provided which is preferably embodied as a stack in which a plurality of piezoceramic green films are arranged alternately with an internal electrode material.

Method Step T3:
The component block 1 provided is sawed or divided up into the plurality of components 11-16 by means of the wire saw S provided.

Although the present invention has been described here on the basis of the preferred exemplary embodiments, it is not restricted to said embodiments, but can be modified in numerous ways. For example it is conceivable to use the wire saw in accordance with FIGS. 2A, 2B und 3 to manufacture a piezo stack which in its turn is used in the production of a piezo actuator. This piezo actuator can in its turn be used in the production of an injection system for injecting fuel at a predetermined fuel pressure. Then the piezo actuator is embodied such that it is suitable for raising and lowering a nozzle needle which opens and closes a nozzle by means of which the fuel is injected.

What is claimed is:

1. A wire saw for separating a plurality of ceramic components from a ceramic component block comprising:
    a roller system with a plurality of deflection rollers which guide a wire;
    at least one of the deflection rollers comprising a plurality of separate disks via which an individual wire winding of the wire is guided; and
    an axle for mounting the plurality of separate disks through their respective center points;
    wherein each of the disks of the plurality of separate disks has a respective axis of rotation which is inclined at a selectable angle of less than 90° to the axle connecting the center points of the disks,
    wherein the roller system and the wire form a wire harp.

2. The wire saw according to claim 1, comprising an adjustment facility which adjusts an offset between parallel wire sections of the wire harp to set a cut width of the wire saw as a function of a predefined diameter of the disks and the selectable angle.

3. The wire saw according to claim 1, wherein the component block is embodied as a stack in which a plurality of ceramic green films or piezoceramic green films are arranged with an internal electrode material.

4. The wire saw according to claim 1, wherein the ceramic components are embodied as a piezo stack in which a plurality N of first internal electrodes and a plurality N of second internal electrodes are arranged, with a piezoceramic green film being arranged between a first internal electrode and a second internal electrode and the plurality N of first internal electrodes able to be contacted by a first external electrode and the plurality N of second internal electrodes by a second external electrode.

5. A method for producing a wire saw for separating a plurality of ceramic components from a ceramic component block, comprising the following steps:
    providing a roller system with a number of deflection rollers which guide a wire for embodying a wire harp;
    dividing at least one of the deflection rollers into a plurality of separate disks mounted through their respective center points on an axle, each of the plurality of separate disks having a respective axis of rotation;
    guiding of an individual wire winding of the wire over one of the plurality of separate disks; and
    inclining the plurality of separate disks at an adjustable angle which is less than 90° with respect to the axle connecting the center points of the disks.

6. The method according to claim 5, wherein an offset between parallel wire sections of the wire harp is set to adjust a cutting width of the wire saw as a function of a predefined diameter of the disks and of the adjustable angle.

7. The method according to claim 6, wherein the ceramic components is embodied as a piezo stack in which a plurality N of first internal electrodes and a plurality N of second internal electrodes are arranged, with a piezoceramic green film being arranged between a first internal electrode and a second internal electrode and the plurality N of first internal electrodes being able to be contacted with a first external electrode and the plurality N of second internal electrodes by a second external electrode.

8. The method according to claim 5, wherein the component block is embodied as a stack in which a plurality of piezoceramic green films are arranged alternately with an internal electrode material.

9. The method according to claim 8, wherein the ceramic components is embodied as a piezo stack in which a plurality N of first internal electrodes and a plurality N of second internal electrodes are arranged, with a piezoceramic green film being arranged between a first internal electrode and a second internal electrode and the plurality N of first internal electrodes being able to be contacted with a first external electrode and the plurality N of second internal electrodes by a second external electrode.

10. The method according to claim 5, wherein the ceramic components are embodied as a piezo stack in which a plurality N of first internal electrodes and a plurality N of second internal electrodes are arranged, with a piezoceramic green film being arranged between a first internal electrode and a second internal electrode and the plurality N of first internal electrodes being able to be contacted with a first external electrode and the plurality N of second internal electrodes by a second external electrode.

11. A method for separating a plurality of ceramic components from a ceramic component block comprising the following steps:
    providing a wire saw comprising a roller system with a plurality of deflection rollers which guide a wire wherein at least one of the deflection rollers comprises a plurality of separate disks each having a respective axis of rotation and mounted through their respective center points along an axle, via which an individual wire winding of the wire is guided and wherein the respective axes of rotation are inclined at a selectable angle of less than 90° to the axle connecting the center points of the disks, wherein the roller system and the wire form a wire harp;
    providing a component block; and
    sawing the component block into the plurality of the components by means of the wire saw.

12. The method according to claim 11, wherein an adjustment facility is provided which adjusts an offset between parallel wire sections of the wire harp to set a cut width of the wire saw as a function of a predefined diameter of the disks and the selectable angle.

13. The method according to claim 11, wherein the component block is embodied as a stack in which a plurality of ceramic green films or piezoceramic green films are arranged with an internal electrode material.

14. The method according to claim 11, wherein the ceramic components is embodied as a piezo stack in which a plurality N of first internal electrodes and a plurality N of second internal electrodes are arranged, with a piezoceramic green film being arranged between a first internal electrode and a second internal electrode and the plurality N of first internal electrodes able to be contacted by a first external electrode and the plurality N of second internal electrodes by a second external electrode.

* * * * *